Sept. 11, 1945.  C. W. TRIPPENSEE  2,384,710
TELESCOPIC TRIPOD LEG
Filed June 15, 1944
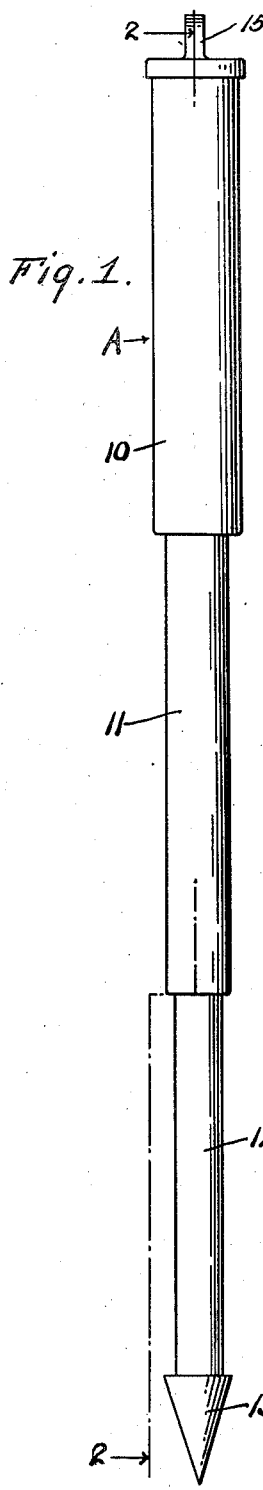
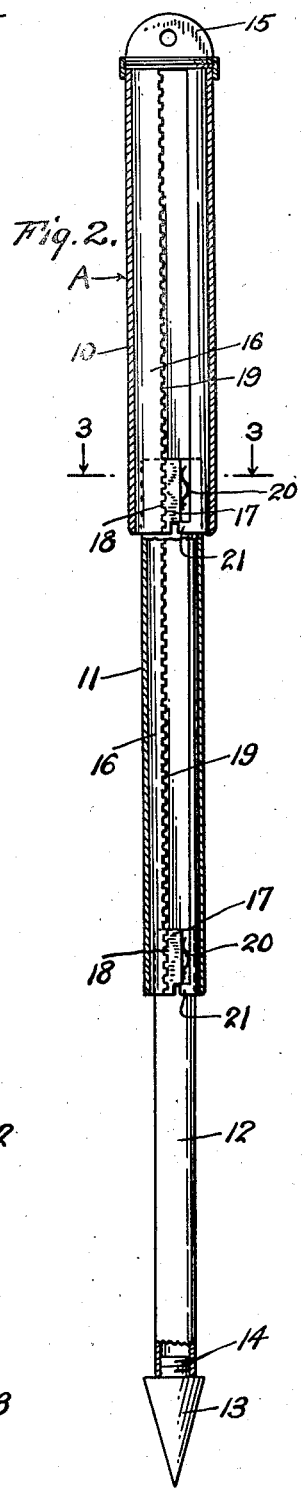
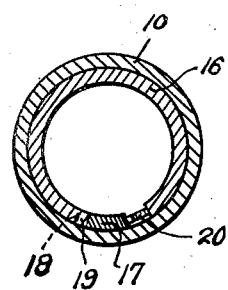
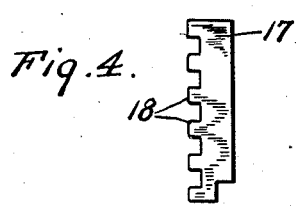
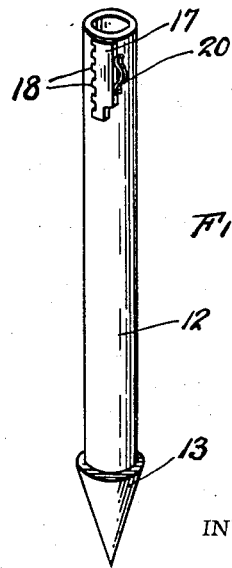
INVENTOR.
Christ W. Trippensee
BY Victor J. Evans & Co.
ATTORNEYS Patented Sept. 11, 1945

2,384,710

UNITED STATES PATENT OFFICE 2,384,710

TELESCOPIC TRIPOD LEG

Christ. W. Trippensee, Jefferson City, Mo.

Application June 15, 1944, Serial No. 540,424

2 Claims. (Cl. 248—191)

The invention relates to a tripod leg, and more especially to adjustable legs for tripods used with surveying instruments, cameras, or other tripod supported equipment.

The primary object of the invention is the provision of a structure of this character, wherein the sectional stretches thereof are detachably latched in a novel manner, when extended or contracted, without the use of set screws or the like, and without liability of becoming accidentally unlatched.

Another object of the invention is the provision of a structure of this character, wherein the sections thereof are telescopically interfitted with each other, and these can be readily and conveniently extended or contracted with relation to one another, they being slidably connected together, and such sections are adaptable for latching engagement with each other, so that they may be locked under adjustment thereof, thereby enabling the article or equipment supported by the tripod to be brought to a level position with ease and dispatch.

A further object of the invention is the provision of a structure of this character, wherein the latching and unlatching of the sections thereof is had in a novel and unique manner, and when latched will be firm and secure, so as to avoid any possibility of accidentally becoming loose or unlatched.

A still further object of the invention is the provision of a structure of this character, which is simple in construction, thoroughly reliable and efficient in operation, strong, durable, susceptible of ready and easy adjustment, with dispatch, and inexpensive to manufacture and install.

With these and other objects in view, the invention consists in the features of construction, combination and arrangement of parts as will be hereinafter more fully described, illustrated in the accompanying drawing, which shows the preferred embodiment of the invention, and pointed out in the claims hereunto appended.

In the accompanying drawing:

Figure 1 is a side view of a tripod leg constructed in accordance with the invention.

Figure 2 is a sectional view taken on the line 2—2 of Figure 1 looking in the direction of the arrows.

Figure 3 is a sectional view taken on the line 3—3 of Figure 2 looking in the direction of the arrows.

Figure 4 is a side view of one member of the latch.

Figure 5 is a perspective view of the foot section of the leg showing member in Figure 1 fabricated thereto.

Similar reference characters indicate corresponding parts throughout the several views in the drawing.

Referring to the drawing in detail, A designates generally one of the legs of a tripod as constructed in accordance with the invention, and this leg comprises a plurality of tubular sections 10, 11 and 12, respectively, the latter section 12 being the foot section, and carries a pointed outwardly tapered anchoring tip 13, which is detachably fastened at 14 thereto. The section 10 carries a pivot ear 15 for the swinging connection thereof to a platform or table, which may be termed the head of a tripod of any conventional construction.

The sections 10, 11 and 12 are telescopically interfitted with each other for the extension and contraction of the leg A in the adjustment thereof for use. The sections 10 and 11 are longitudinally slotted at 16, as best seen in Figure 2 of the drawing, while at the telescoped end of each of the sections 11 and 12, is fixed a rack toothed block 17, its teeth being indicated at 18, and this block is elongated and of a width less than the width of the slot 16, in which it is received, so that the teeth 18 can be engaged with and disengaged from companion teeth 19 formed along one edge of the said slot 16. In this manner, the sections 11 and 12 are latched and unlatched to and from each other, and the section 11 latched to and unlatched from the section 10. The latching and unlatching is effected by a slight rotation of the particular section with respect to the other.

The block 17 is backed by a bowed leaf spring 20 which has tension against the straight unmutilated smooth edge 21 of the slot 16 next thereto, one end of this spring 20 being fixed to the block 17 in any suitable manner, and such spring urges the teeth 18 of the block 17 into engagement with the teeth 19 in the edge of the slot 16, and also permits of the separation of these teeth for the latching and unlatching of the sections 10, 11 and 12, of the leg A, as should be clearly apparent from Figure 2 of the drawing.

The sections 11 and 12 can be adjusted relative to the section 10, to any selected degree, the sections 11 and 12 being provided with stops 21 co-acting with the blocks 17 so that these sections, together with the section 10 cannot be separated from one another on extension thereof, during adjustment of the tripod legs.

Each leg A can be composed of any desired number of sections telescopically interfitted with each other.

From the foregoing, it is thought that the construction and manner of operation of the leg will be clearly understood, and therefore, a more extended explanation has been omitted.

It is, of course, understood that changes, variations and modifications may be resorted to in the construction of the invention, as fall properly within the scope of the claims hereunto appended, without departing from the spirit of the invention or sacrificing any of its advantages.

What is claimed is:

1. A leg structure of the kind described, comprising a plurality of telescopically interfitted sections, all but one of the sections having elongated slots longitudinally thereof one edge of said slots being provided with rack teeth, the other edge of said slot being unmutilated, and a tensioned displaceable rack toothed block, of a lesser width than said slots fixed to the end of all sections excepting one slotted section and working within the slots for latching and unlatching the sections to each other.

2. A leg structure of the kind described, comprising a plurality of telescopically interfitted sections, all but one of the sections having elongated slots longitudinally thereof one edge of said slots being provided with rack teeth, the other edge of said slot being unmutilated, and a tensioned displaceable rack toothed block of a lesser width than said slots and working within the slots for latching and unlatching the sections to each other, said toothed block being fixed to all sections, excepting one slotted section and stops formed in said slotted sections adapted to coact with stops joined on said blocks to prevent separation of said sections.

CHRIST. W. TRIPPENSEE.